June 9, 1936.  G. A. ALLWARD  2,043,603

BAND SAW AND THE LIKE

Filed March 1, 1935

Inventor
G. A. Allward
By Chas. J. Williamson
Attorney

Patented June 9, 1936

2,043,603

UNITED STATES PATENT OFFICE 2,043,603

BAND SAW AND THE LIKE

George A. Allward, Hagerstown, Md.

Application March 1, 1935, Serial No. 8,924

3 Claims. (Cl. 143—133)

Band saw blades as immemorially made are in the form of a thin, flat flexible ribbon with teeth on one edge thereof. Because of such form of the blade and limitations imposed by the machine structure due to such form of the blade, the cut made thereby must be only in one direction, that direction, of course, being perpendicular to the plane of the toothed edge or in the plane or parallel with the plane of the width of the blade. There are other serious practical objections to this customary form of band saw, and some of them will be hereinafter pointed out in comparison with a band saw made in accordance with my invention. An object of my invention is to provide a sawing cutter having the endless band characteristic of the usual band saw blade and capable of being driven and guided in a similar manner by pulleys but which will be free from the limitations and objections which I have just generally noted and which will in other respects have important practical advantages thereover. Certain features of my invention while of especial advantage in the construction of an endless cutting device of the band saw type are also applicable to other tools or appliances than those which perform a sawing or cutting-through operation, so that it is to be understood that my invention consists in whatever is described by or is included within the terms or scope of the appended claims.

Figure 1:
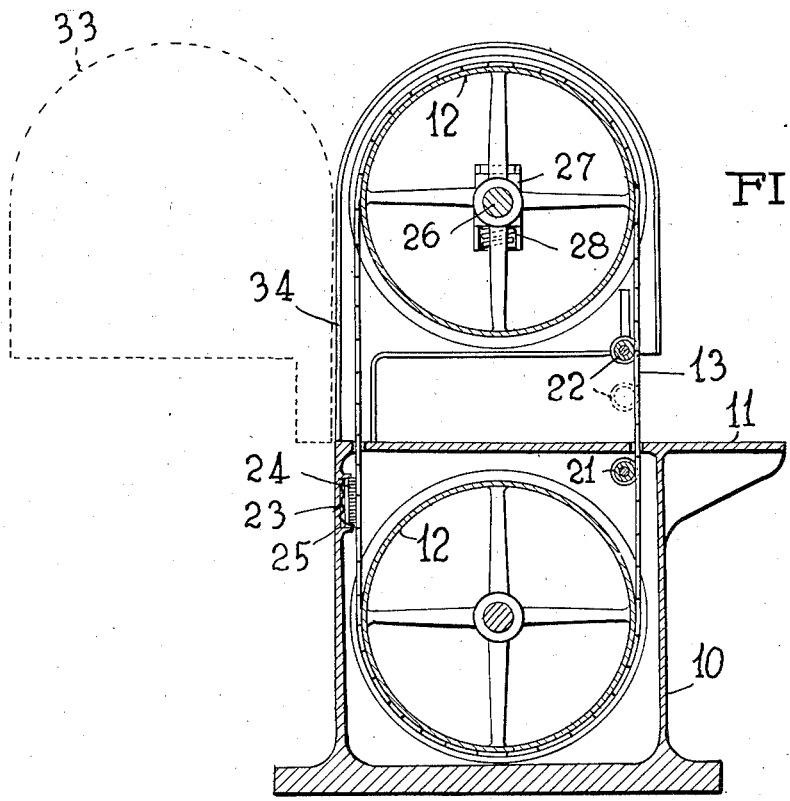
Fig. 1 is a view somewhat diagrammatic in vertical section of an embodiment of my invention in a band saw machine.

First, briefly describing the characteristics of my band saw "blade", or device that acts sawlike to cut through material to be cut into pieces or otherwise operated on in a sawing operation, it will be found that it is composed of such a number as is necessary of cylindrical cutting elements placed or threaded end to end on a flexible core which may be a single wire or a cable which is endless, such endlessness being achieved, for example, by suitably joining the ends of the core after the stringing or threading of the cutting elements or sections thereon so that my "blade" has the endless band characteristic of the usual band saw blade and its flexibility that enable it to be applied to spaced apart pulleys as in the usual band saw machine. Since the cutting elements or sections are themselves rigid, they must have a length with reference to the radius or circumference of the pulleys as to conform to the pulley circumference in passing thereover, the length of each section being such that the bending moment when the section passes over the circumference of the pulley shall be sufficiently small to avoid breakage of the section under bending stresses. Of course, what is the inner periphery of my saw "blade" and what is the outer periphery thereof when the endless cutter passes over the periphery of the pulley or wheel differ slightly in radius and this necessitates such a form of the adjacent or abutting ends of the sections as to accommodate the endless cutter to this condition, and I illustrate in the drawing several end formations of the cutting sections to effect such accommodation.

As will be apparent, the file-like or cutting surface of the cylindrical sections gives such bite on the pulley periphery with which the inner surfaces of the sections are in contact as to assure an efficient drive between pulley and endless cutter making unnecessary any other form of drive. It will be seen that the drive of my endless saw or cutter that carries the straight portion thereof through the metal or other material being cut, is due to the end thrust of one cutting section upon the adjacent section ahead of it, and, of course, there is sufficient tension in the core to maintain the cutting straight-line rigidity of the blade or saw. My saw will run at relatively high speeds so that end thrust on the sections and the torque will be small.

A very important advantage of a saw blade made of short sections compared with the customary band saw blade is that any damage to the latter necessitates discarding the entire blade, whereas injury to one or even more sections of my saw involves merely discarding the damaged sections and the replacement thereof.

Proceeding now with the description in some detail of what is shown in the drawing, I show in Fig. 1 my invention as applied to a band saw machine which comprises a frame 10, with a horizontal table 11, and two wheels or pulleys 12, placed as usual in band saw machines, one below the table and the other above the table, so as to present a straight portion of the flexible saw blade or cutter 13, just above the table for presentation thereto of material to be cut. Since the blade or saw is round in cross-section, every side thereof is available for cutting, and accordingly the work to be cut can be presented thereto from any direction necessary or desirable, it is possible to cut sharply curved shapes and articles of any length can be cut in two or in pieces.

Figure 2:
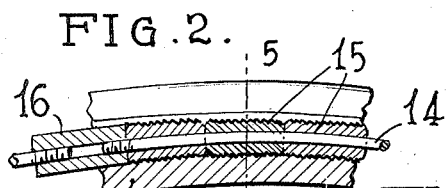
Fig. 2 is a detail view on a much larger scale of a portion of the cutting element or cutter and a fragment of one of the pulleys with parts in section in a plane at right angles to the axis of revolution of the pulley.
Figures 3, 4:
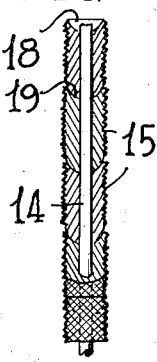
Fig. 3 is a similar view illustrating another embodiment of my invention as to the cutter construction.
Fig. 4 is a like view of still another embodiment of my invention.

As shown best in Figs. 2, 3 and 4, the blade or saw consists of an endless core of flexible wire 14, and short lengths or sections 15, of longitudinally perforated cylinders, that is to say, tubular sections that are round in cross-section whose entire periphery is a file or other form of cutting surface, and these sections are placed end to end so that adjacent sections may exert an end thrust upon one another by appropriate bearing contact of the end of one against the adjacent end of another. As shown in Fig. 2, the ends of the wire core after the threading or stringing thereon of the sections may be joined by a turn buckle device 16, with right and left thread to engage corresponding threads on the ends of the wire. But, of course, other methods or means of joining the core into an endless band may be employed.

As shown in Fig. 2, to allow the necessary flexing or play of the saw or cutter-forming sections in passing over the pulley circumference, the ends of the sections adjacent the peripheries thereof may be chamfered or beveled, to provide slight spaces or gaps sufficient for the purpose while leaving the central portions of the sections contiguous to the core in planes at right angles to the section axis so as to maintain sufficient bearing surfaces between adjacent sections.

As shown in Fig. 3, the sections may have their ends at right angles to their longitudinal axes and between the ends of adjacent sections may be placed thin washers 17, of elastic material which will allow relative lateral movement of the sections on the flexible core for accommodation to the curvature of the pulley circumference.

And as shown in Fig. 4, there may be a ball and socket engagement of cutter section ends, there being at one end of each section a spherical concavity 18, and at the other end a spherical convexity 19, the radii of the two matching, so that there is smooth rocking of one section on the other. And in this case the direction of rotation or travel of the saw or cutter is with the convexity forward.

Figure 6:
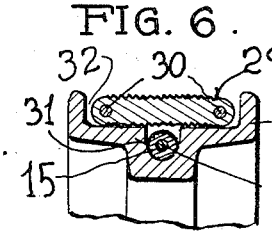
Fig. 6 is a similar view illustrating a form of pulley rim suitable only for use with a saw embodying my invention, when such saw is made up of tubular lengths or sections of file-like sections round in cross section with the entire surface a cutting surface.
Figure 5:
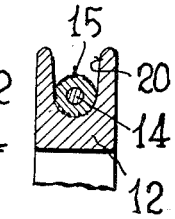
Fig. 5 is a detail view in section on the line 5—5 of Fig. 2.

As shown in Figs. 5 and 6, each pulley periphery has a circumferentially extending groove or channel 20, to receive the saw 13, and by contact therewith at opposite sides to prevent lateral shifting or displacement thereof. And to support the straight portion of the saw during a cutting operation, grooved guide rollers are preferably placed above and below the table 11, the lower guide roller 21 being preferably in fixed bearings and the upper guide roller 22 being shiftable or adjustable vertically so that the points of support by these guide rollers under thrust of the work may be placed as near together as may be desirable and to suit the vertical dimensions of the article being cut or sawed.

And as sawdust would lodge in and tend to choke up the cutting faces of the sections, I prefer to provide a cleaning brush which at all times is in contact with the saw or blade so that as the latter moves thereover, the sawdust will be dislodged or removed. Thus as shown in Fig. 1, a brush 23, of wire bristles may be provided placed in a recess 24, in the back wall of the frame 10, and engaged by a suitable spring 25, which presses the bristles against the passing blade. Preferably the bearings of the upper pulley shaft 26, are spring supported in order to maintain a known constant tension in the wire core and thereby prevent the subjection of the saw to undue tension upon installation. Thus as shown in Fig. 1, the shaft at each end is supported by a vertically movable bearing block 27, that has suitable vertical guides and at its bottom rests upon an expansion coil spring 28, whose lower end is supported by a screw or bolt.

Figure 7:
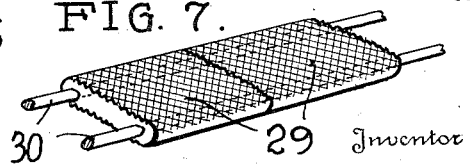
Fig. 7 is a detail view in perspective of a portion of the sections that go to make up the cutting member or element of the form fitted for interchangeable use, as in the illustration in Fig. 5 with the cutter or saw that is round in cross section.

The building up of the endless saw or cutter by threading or stringing short working sections upon a flexible core may be utilized in the construction of a file made up as shown in Fig. 7, of fairly broad flat pieces or sections 29, threaded or strung end to end on two parallel flexible cores 30, at the opposite narrow edges thereof, both outer and inner extended flat surfaces of the sections being file faces, so that when one face is outermost for filing, the other is innermost and therefore has the "bite" contact with the periphery of the driving pulley 12. And, of course, both flat faces being working faces when one is worn to an objectionable degree, the sections may be reversed and thus double filing service obtained from the sections. The worn surface though unsuitable for filing may nevertheless be adequate to give the bite or friction connection with the pulley for driving.

To enable one machine to serve both for sawing and filing, the pulleys 12, as best shown in Fig. 5, may have two annular channels, one 31 for the saw or cutter blade, and the other 32 of greater diameter because it must be wide enough to accommodate the file device. Of course, when sawing, the filing device is removed from the pulleys.

To facilitate installation of the saw, one side of the housing above the table 11 is removable to give access to the upper pulley 12, such side 33 being indicated in dotted lines in Fig. 1, which is in its open or out of the way position secured by a hinge connection 34, on a vertical line with the stationary portion of the housing.

A very important application of my flexible saw composed of cylindrical sections is in the construction of tubular frame works, such as those used in an airplane fuselage. Such tubes are assembled at various angles, a right angle and an acute or an obtuse angle, for example, and there is a joint made between the end of one tube and the side of another tube which requires the cutting of a notch in the end of one of the tubes, suitable to whatever angle is required. With such a saw as mine and with the sections of the appropriate diameter, it is a simple matter to saw the desired notch in the tube end as a purely mechanical operation so as to assure accurate matching radius of the notch with the curved exterior of the tube side with which the junction or connection is to be made.

What I claim is:

1. A band saw composed of an endless series of tubular sections, round in cross-section, the entire peripheral surface of the sections being a cutting surface and the individual sections being rigid from end to end, and a flexible endless core upon which such sections are threaded the series being coextensive with the core length.

2. A band saw for cutting work upon a work support comprising an end to end series of sections perforated from end to end, an endless flexible core passing through such perforations of the sections and joining them in an endless series, the sections abutting end to end, the individual sections being rigid from end to end, and the sections having cutters distributed over a multiplicity of side faces thereof and such saw being adapted to pass over the characteristic pulleys of a band saw machine.

3. A band saw as in claim 2 in which the series of end to end sections are round in cross section and the entire peripheral surface thereof, from end to end, has cutters.

GEORGE A. ALLWARD.